(12) United States Patent
Shinya et al.

(10) Patent No.: US 8,646,507 B2
(45) Date of Patent: Feb. 11, 2014

(54) CHARGING APPARATUS

(75) Inventors: Yoshihisa Shinya, Tochigi (JP); Yasumi Endo, Tochigi (JP); Yukio Suyama, Tochigi (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 13/394,007

(22) PCT Filed: Sep. 3, 2010

(86) PCT No.: PCT/JP2010/065179
§ 371 (c)(1),
(2), (4) Date: May 18, 2012

(87) PCT Pub. No.: WO2011/027874
PCT Pub. Date: Mar. 10, 2011

(65) Prior Publication Data
US 2012/0229947 A1 Sep. 13, 2012

(30) Foreign Application Priority Data
Sep. 4, 2009 (JP) .................................. 2009-205172

(51) Int. Cl.
*B65C 11/04* (2006.01)

(52) U.S. Cl.
USPC ..................................................... 156/578

(58) Field of Classification Search
USPC ..................................................... 156/578
See application file for complete search history.

(56) References Cited

U.S. PATENT DOCUMENTS

| | | | | |
|---|---|---|---|---|
| 4,776,351 A | * | 10/1988 | Wahle et al. | 131/69 |
| 5,268,049 A | * | 12/1993 | Marriott et al. | 156/99 |
| 6,231,705 B1 | * | 5/2001 | Kanashima et al. | 156/74 |
| 6,231,706 B1 | | 5/2001 | Higaki et al. | |
| 2008/0283192 A1 | * | 11/2008 | Shinohara et al. | 156/380.2 |
| 2009/0297990 A1 | * | 12/2009 | Ono et al. | 430/325 |
| 2012/0229947 A1 | * | 9/2012 | Shinya et al. | 361/225 |
| 2012/0247644 A1 | * | 10/2012 | Usui et al. | 156/64 |
| 2012/0247683 A1 | * | 10/2012 | Matsumoto et al. | 156/578 |

FOREIGN PATENT DOCUMENTS

| | | |
|---|---|---|
| JP | 61-194662 A | 8/1986 |
| JP | 2006-134545 A | 5/2006 |
| WO | 97/35720 A1 | 10/1997 |

OTHER PUBLICATIONS

International Search Report issued in PCT/JP2010/065179, mailed on Oct. 5, 2010, with translation, 2 pages.
Extended European Search Report issued in corresponding European Application No. 10813821.5 dated Mar. 22, 2013 (7 pages).

* cited by examiner

*Primary Examiner* — Ronald W Leja
(74) *Attorney, Agent, or Firm* — Osha Liang LLP

(57) ABSTRACT

A charging apparatus includes a plurality of holding members that holds a pair of plate-shaped members in a state the major surfaces of the plate-shaped members face each other, a movement member that causes the holding members to be moved towards and away from each other, an emission nozzle configured to be introduced into a gap between the plate-shaped members, retained by the holding members, to emit the charging liquid into the gap, a nozzle movement unit that causes movement of the emission nozzle in an in-plane direction of the plate-shaped members, a reservoir in which the charging liquid is to be accumulated, and a thrust unit that causes the charging liquid accumulated in the reservoir to be emitted via the emission nozzle.

9 Claims, 8 Drawing Sheets

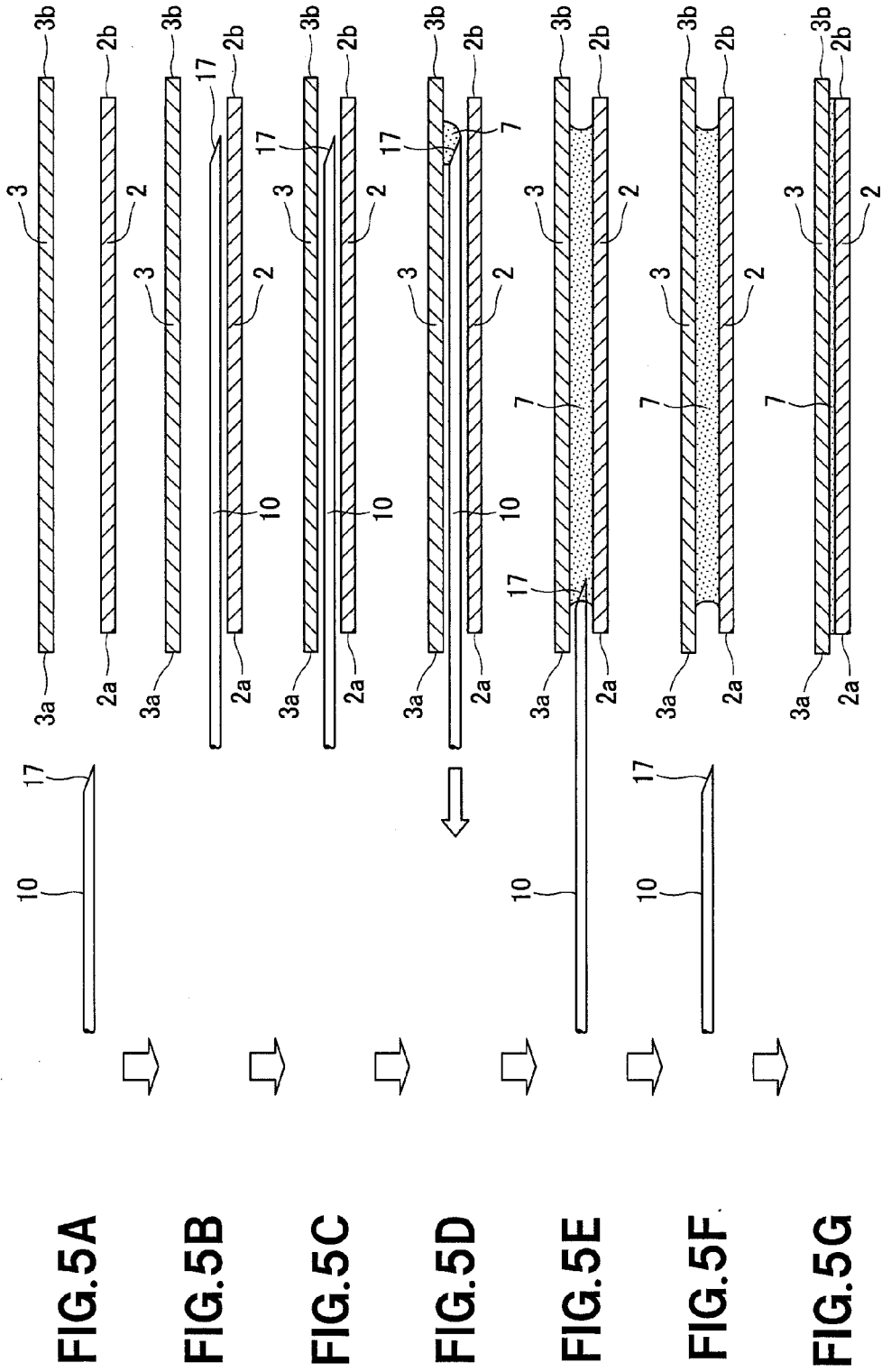

CHARGING APPARATUS

TECHNICAL FIELD

This invention relates to an apparatus for charging a liquid into a space between plate-shaped members, for example, an apparatus for charging a resin liquid into a space between large-sized plate-shaped members, such as picture image display panels and transparent plate-shaped members.

The present application asserts priority rights based on JP Patent Application 2009-205172 filed in Japan on Sep. 4, 2009. The total contents of disclosure of the Patent Application of the senior filing date are to be incorporated by reference into the present Application.

BACKGROUND ART

Among conventional methods for bonding plate-shaped members together, there is known a method employing an apparatus for bonding disc substrates together (see Patent Publication 1). This sort of the bonding apparatus includes a stage on which a stamper is set, a substrate holding stage adapted for movement in the up-and-down direction above the stage and configured for holding a bonding substrate thereon, and a nozzle for spraying an adhesive on the stamper.

In the bonding apparatus, when the stamper is set on the stage, and the substrate holding stage sucks the substrate under vacuum to hold the substrate in a facing relationship to the stamper, the stage and the substrate holding stage are set into rotation, at the same time that an adhesive is applied from the nozzle onto the stamper. The adhesive descends onto the stamper to heap thereon so as to be contacted with the substrate as well. As the rotation is continued, the adhesive is spread in a space between the stamper and the substrate, while an excess portion of the substrate is swung off. The adhesive is then cured by ultraviolet radiation or heating to cause the stamper and the substrate bonded together.

RELATED TECHNICAL DOCUMENT

Patent Document

Patent Document 1: Japanese Laid-Open Patent Publication S61-194662

In the related art for bonding apparatus, the nozzle is fixed when the adhesive is coated on the stamper and on the substrate, and the adhesive is spread out on rotation over an entire surface area for bonding. At this time, the adhesive swung off towards an outer rim becomes affixed to en end face of the substrate or the stamper to produce contaminants that possibly cause inconveniences such as scattering of incident light. The adhesive will also become affixed to other sites of the nozzle than its exit opening and need to be removed by an extremely labor-consuming operation.

In the case of a relatively small-sized tough plate-shaped member, such as optical disc, the adhesive may be spread over the entire planar surface, if the disc is run into rotation. However, if the plate-shaped member is large-sized, as in the case of the liquid crystal television or the liquid crystal monitor, the method of rotating the plate-shaped member to apply an adhesive to its entire surface may hardly be applied.

It is also useful to prevent air bubbles from intruding into the adhesive during the process of bonding plate-shaped members.

It is desirable to provide a charging apparatus which may be applied to the process of bonding large-sized plate-shaped members, and in which bonding may be carried out as air bubbles are prevented from mixing into the adhesive.

SUMMARY OF THE INVENTION

Generally, according to one or more embodiments of the present invention, a charging apparatus includes a plurality of holding members for holding a pair of plate-shaped members in a state the major surfaces of the plate-shaped members face each other, and a movement member that causes the holding members to be moved towards and away from each other. The charging apparatus also includes an emission nozzle configured to be introduced into a gap between the plate-shaped members, retained by the holding members, to emit the charging liquid into the gap. One or more embodiments of the charging apparatus also include a nozzle movement unit for causing movement of the emission nozzle in an in-plane direction of the plate-shaped members, and a reservoir in which the charging liquid is to be accumulated. The charging apparatus further includes a thrust unit that causes the charging liquid accumulated in the reservoir to be emitted via the emission nozzle. The charging liquid, emitted via the emission nozzle, is charged as the liquid is contacted with the plate-shaped members carried in a relation of facing each other.

According to one or more embodiments of the present invention, the emission nozzle emits a charging liquid into a gap between the plate-shaped members, as the emission nozzle is moved. Since the charging liquid is applied as it is deposited on both of the plate-shaped members, carried for facing each other, the charging liquid may be emitted not only for the small-sized plate-shaped member, but also for the large-sized plate-shaped member. In addition, air bubbles may be prevented from being left in the charging liquid.

BRIEF DESCRIPTION OF THE DRAWINGS

FIGS. 5A to 5G are cross-sectional views showing, step-by-step, the process of charging by the charging apparatus.

DETAILED DESCRIPTION OF THE INVENTION

Figure 1:
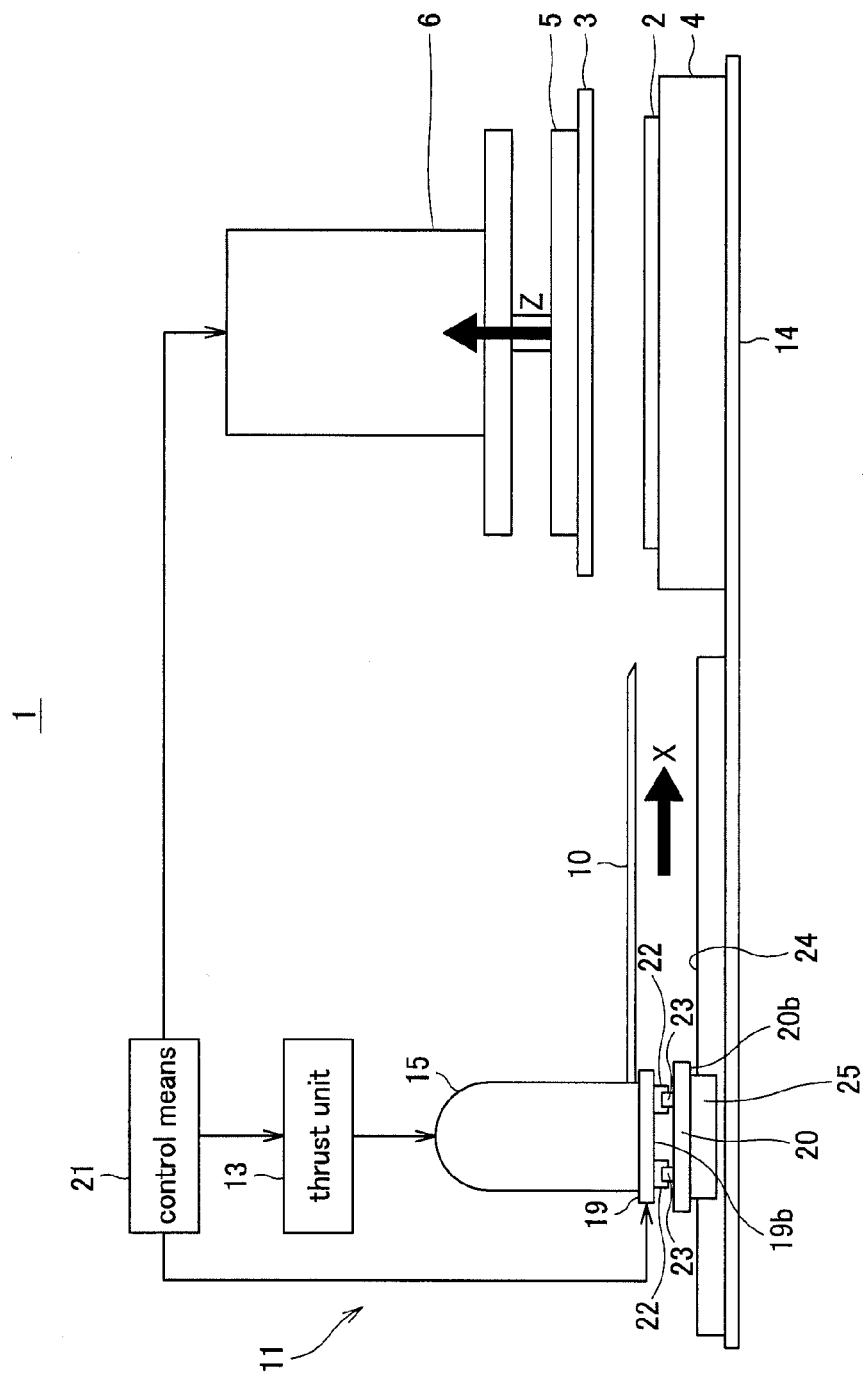
FIG. 1 is a side view showing a charging apparatus according to one or more embodiments of the present invention.

A charging apparatus according to one or more embodiments of the present invention will now be explained in detail with reference to the drawings.

In a charging apparatus 1, the plate-shaped members are a liquid crystal panel 2 and a protective panel 3 that is to protect the surface of the liquid crystal panel 2. In the charging apparatus 1, an adhesive 7 is charged into a space between the liquid crystal panel 2 and the protective panel 3 to bond the panels 2, 3 together.

Figure 2:
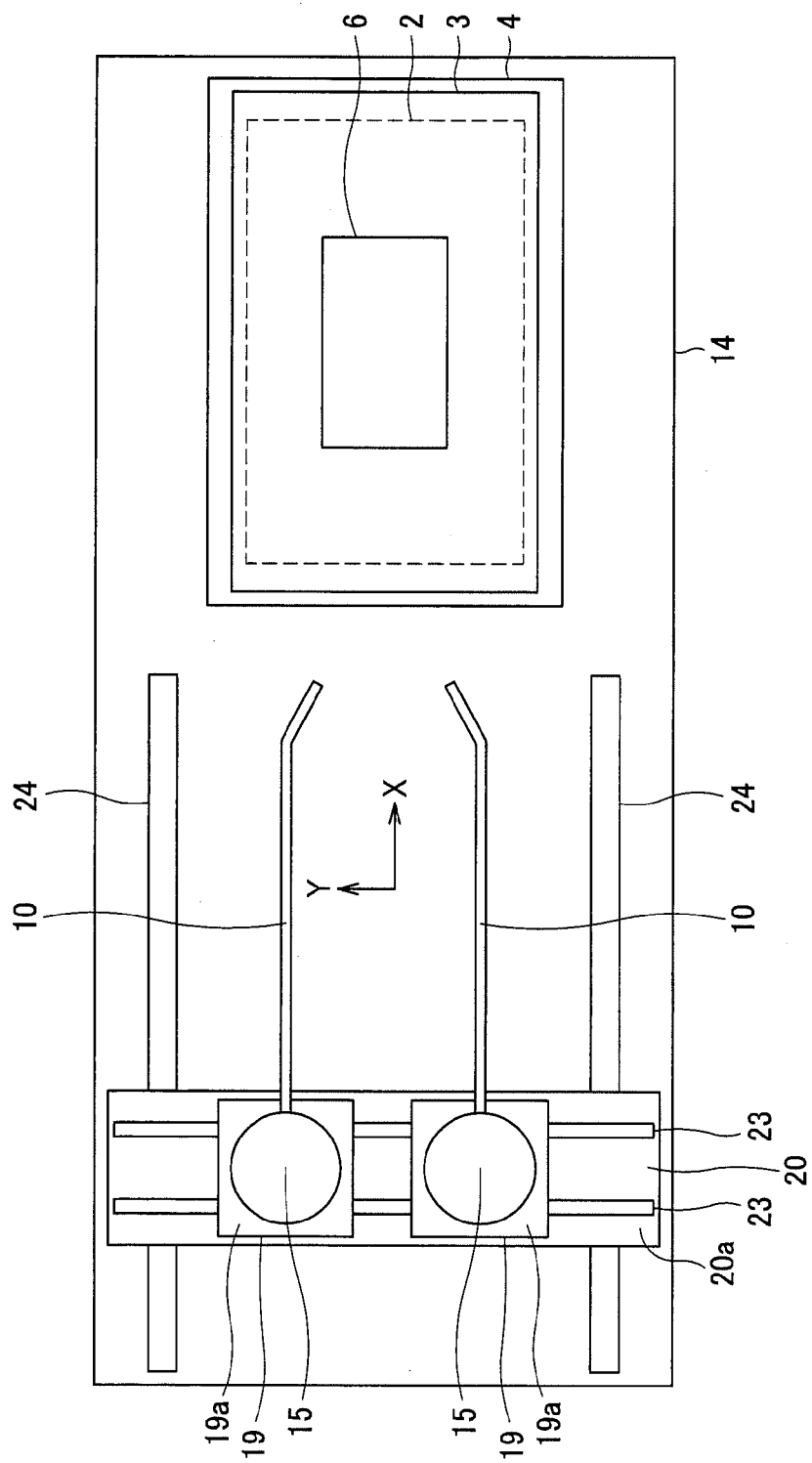
FIG. 2 is a plan view of the charging apparatus shown in FIG. 1.

Referring to FIGS. 1 and 2, the charging apparatus 1 includes a liquid crystal panel holding stage 4, holding the liquid crystal panel 2, and a protective panel holding stage 5, holding the protective panel 3. The charging apparatus also includes an actuator 6 that causes an up-down movement of the protective panel holding stage 5 to cause the protective panel 3 to be moved towards and away from the liquid crystal panel 2. The charging apparatus also includes an emission nozzle 10 that may be introduced into a space or gap between the liquid crystal panel 2 and the protective panel 3 to emit an adhesive 7, and a nozzle movement unit 11 that causes movement of the emission nozzle 10. The charging apparatus further includes a syringe 15 connected to the emission nozzle 10 to accumulate therein the adhesive 7, and a thrust unit 13 that causes the adhesive 7 to be emitted by a thrusting action via an emission opening 17 of the emission nozzle 10. The above component parts are mounted on a table 14.

The liquid crystal panel 2 is a liquid crystal cell enclosed in a space between substantially rectangular-shaped upper and lower glass substrates. The protective panel 3 is to be bonded to the glass substrate of the liquid crystal panel directed to a viewer of the television. The protective panel 3 plays the role of improving the viewing performance of the liquid crystal panel 2 and protecting the liquid crystal panel 2 from impacts or damages, and is formed by a transparent plate of reinforced glass or a plate of an acrylic resin.

The liquid crystal panel holding stage 4, holding the liquid crystal panel 2, is affixed to the table 14, and securely holds the liquid crystal panel 2, by a means such as vacuum suction, not shown, so that a bonding surface thereof to the protective panel 3 will face a front side. The protective panel holding stage 5, holding the protective panel 3, is carried by the actuator 6 above the liquid crystal panel holding stage 4 and holds the protective panel 3 by means such as vacuum suction so that the bonding surface of the protective panel 3 to the liquid crystal panel 2 equally faces the front side. A suction surface for the liquid crystal panel 2 of the liquid crystal panel holding stage 4 is set substantially horizontally to hold the major surface of the liquid crystal panel 2 substantially horizontally. In similar manner, a suction surface for the protective panel 3 of the protective panel holding stage 5 is set in a substantially horizontal direction to hold the major surface of the protective panel 3 substantially horizontally.

The liquid crystal panel holding stage 4 and the protective panel holding stage 5 are preferably transparent for the sake of position registration between the liquid crystal panel 2 and the protective panel 3. However, such is not always necessary and position matching between the two panels may also be by any suitable one of a variety of well-known position matching methods.

The actuator 6, carrying the protective panel holding stage 5, causes movement of the protective panel holding stage 5 in an up-and-down direction as indicated by an arrow-Z direction and in the anti-arrow Z direction in FIG. 1. When the liquid crystal panel 2 or the protective panel 3 is to be fixedly set on the holding stage 4 or 5, respectively, the actuator 6 causes an upward movement of the protective panel holding stage 5. When the adhesive 7 is to be charged into a space between the liquid crystal panel 2 and the protective panel 3, the actuator 6 causes a downward movement of the protective panel holding stage 5.

Moreover, in charging the adhesive 7, the actuator 6 causes downward movement of the protective panel holding stage 5 to provide the gap or space so as to maintain the liquid crystal panel 2 and the protective panel 3 therein at a preset distance from each other. This preset distance is such a one for which the emission nozzle 10 may be introduced into the gap or space as later explained and for which the adhesive 7 may be applied as the adhesive is kept in contact with the liquid crystal panel 2 and the protective panel 3. If once the adhesive 7 has been charged, the actuator 6 causes further downward movement of the protective panel holding stage 5 to thrust the protective panel 3 against the liquid crystal panel 2 at a preset force for a preset time length to spread the adhesive 7 over the entire surfaces of the liquid crystal panel 2 and the protective panel 3.

The emission nozzle 10, emitting the adhesive 7 into the space between the liquid crystal panel 2 and the protective panel 3, includes a tubular member extending parallel to the major surfaces of the liquid crystal panel 2 and the protective panel 3. The liquid crystal panel 2 and the protective panel 3 are held by the liquid crystal panel holding stage 4 and by the protective panel holding stage 5, respectively. The emission nozzle 10 is connected to the syringe 15, as a source of the adhesive 7, and carried at a height such that the nozzle may be movable in reciprocation in the gap between the liquid crystal panel 2 and the protective panel 3, arranged proximate to each other, without the nozzle contacting with the panels. The nozzle movement unit 11 causes movement of the emission nozzle 10 in the anti-arrow X, in the arrow-Y direction and in the anti-arrow Y direction, as indicated in FIG. 1, so as to plot a preset emission pattern, as later explained, in the gap between the liquid crystal panel 2 and the protective panel 3.

The emission nozzle 10 has its foremost upper side portion bias-cut as shown in FIG. 3, so that the emission opening 17 thereof is directed vertically upwards. Hence, as the emission nozzle 10 has begun emitting the adhesive 7, the adhesive 7 is initially deposited on the protective panel 3 disposed on an upper side. The adhesive is then deposited by the action of gravity onto the liquid crystal panel 2 disposed on a lower side. The emission nozzle 10 is moved in the gap between the liquid crystal panel 2 and the protective panel 3, as it emits the adhesive 7, and deposits the adhesive 7 at all times on the surfaces of both the liquid crystal panel 2 and the protective panel 3, as shown in FIG. 4.

That is, the charging apparatus 1 is disposed so that the emission opening 17 of the emission nozzle 10 is directed upwards. Moreover, the charging apparatus delivers the adhesive 7 so that the adhesive will be coated at all times on the surfaces of both the liquid crystal panel 2 and the protective panel 3. It is thus possible to prevent air bubbles from being left in the adhesive 7.

Figure 3A:
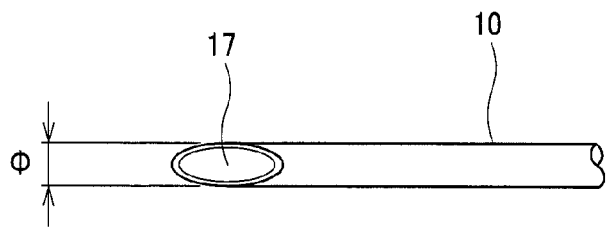
FIG. 3A is a plan view showing a foremost part of an emission nozzle.
Figure 4:
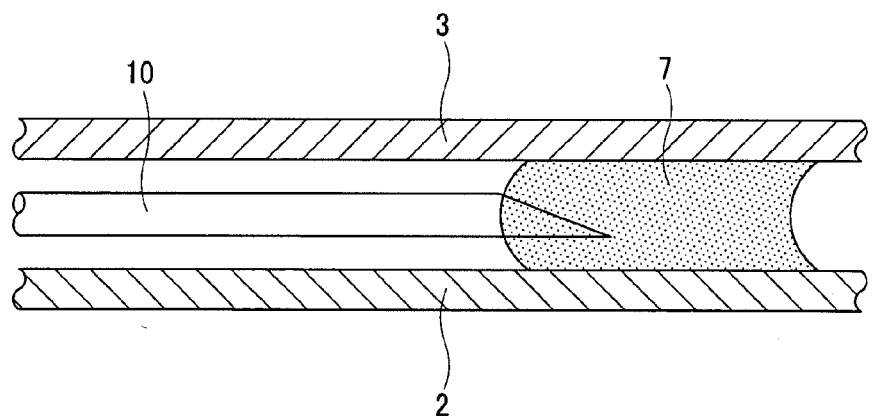
FIG. 4 is a cross-sectional view showing the emission nozzle emitting the charging liquid.

The emission nozzle 10 is formed to a diameter $\phi$ such that 6 mm $\geq \phi \geq$ 2 mm, as shown in FIG. 3A. This diameter $\phi$, which depends on the size of the gap between the liquid crystal panel 2 and the protective panel 3, is selected so that the nozzle will not be contacted with the panels. In addition, the emission nozzle 10 is formed of metal or industrial plastics, and is of such toughness as to allow emitting the adhesive 7 without flexure. That is, the emission nozzle 10 is able to apply the adhesive 7 without being contacted with the liquid crystal panel 2 or the protective panel 3.

Figure 3B:
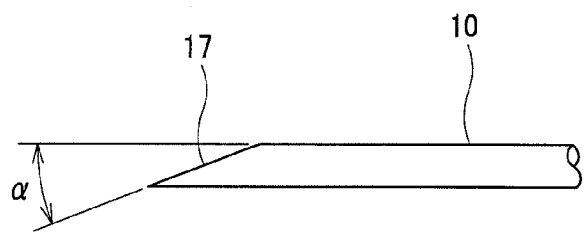
FIG. 3B is a side view thereof.

The emission nozzle 10 is formed so that an angle α of the emission opening 17 will be such that 90°>α≥30°, as shown in FIG. 3B. If the angle α exceeds 90°, the adhesive 7 may not be deposited onto the protective panel 3 at the beginning of emission. Moreover, the adhesive 7 may be left in the emission opening 17 such that the adhesive is likely to be deposited on an unforeseen site. If this angle is less than 30°, it becomes difficult for the adhesive 7 to descend onto the liquid crystal panel 2 disposed on the lower side. In this case, the risk is high that air bubbles are entrained in the adhesive. Specifically, the angle α is determined in a range of 90°>α≥30°, depending on the viscosity of the adhesive 7, so that the adhesive 7 will be initially deposited on the protective panel 3 on the upper side, and then deposited on the liquid crystal panel 2 without entraining air bubbles, with the adhesive being emitted in contact with both panels.

The nozzle movement unit 11, causing the movement of the emission nozzle 10, includes a first nozzle stage 19, on which to set the syringe 15, and a second nozzle stage 20, on which to set the first nozzle stage 19. The first nozzle stage 19 has an upper surface 19a on which the syringe 15 is mounted, and a lower surface 19b on which a slider 22 is mounted. The first nozzle stage 19 is movable in the arrow-Y direction and in the anti-arrow Y direction in FIG. 2 by the slider 22 sliding on a first guide rail 23 mounted on the second nozzle stage 20.

The second nozzle stage 20 has an upper surface 20a on which there is formed the first guide rail 23 that guides the first nozzle stage 19. The second nozzle stage also has a lower surface 20b on which there is formed a slider 25 engaged with a second guide rail 24 mounted on the table 14. The second nozzle stage 20 is movable in the arrow-X direction and in the anti-arrow X direction by the slider 25 sliding along the second guide rail 24 formed in the table 14.

The charging apparatus 1 has two of the nozzle stages 19 to apply the adhesive 7 by two of the emission nozzles 10. The nozzle movement unit 11 includes a control means 21 for controlling the first nozzle stage 19 and the second nozzle stage 20. By this control means, the emission nozzle 10 may be moved in substantially the horizontal direction in operative coordination to the upward/downward movement of the liquid crystal panel holding stage 4 and the protective panel holding stage 5. By so doing, the emission nozzle 10 may be intruded into or receded from the gap between the two panels without the nozzle contacting with the liquid crystal panel 2 or the protective panel 3.

The number of the emission nozzles 10 in the charging apparatus 1 is not limited to two but may also be one or three or more. In any of these cases, each emission nozzle 10 is connected to the syringe 15 as set on the first nozzle stage 19. Each first nozzle stage 19 is carried for sliding movement on the second nozzle stage 20.

In the syringe 19, set on the first nozzle stage 19, there is stored the adhesive 7 to be emitted by the emission nozzle 10. The syringe 15 is connected to the thrust unit 13, which is configured for emitting the adhesive contained via the emission nozzle 10 in such a manner as to control the emission as well as emission stop of the adhesive 7 and to control the emission pressure. The thrust unit 13 may be formed by a cylinder for storing pressurized dry air therein, and the control means 21 is used to control the supply and supply stop of the gas into the syringe 15 as well as to control its supply pressure. The adhesive 7 is emitted from the emission nozzle 10 by supplying the gas under a preset pressure into the syringe 15.

As the adhesive 7, emitted via the emission nozzle 10, a ultra-violet light curing type transparent elastic resin is used. The elastic resin used has its refractive index controlled in such a manner that, even if the adhesive is charged into the space between the liquid crystal panel 2 and the protective panel 3, light scattering may be suppressed to keep the viewing performance of the liquid crystal panel 2 without deterioration.

Also, the adhesive 7 is to be of such a viscosity that the adhesive may be charged as it is deposited simultaneously on both the liquid crystal panel 2 and the protective panel 3 and may remain to be affixed to both of the panels 2, 3 without flowing out at outer edges of the two panels. Specifically, the viscosity of the adhesive is to be in a range of, for example, 1000 to 4000 mPa. The size of the gap between the liquid crystal panel 2 and the protective panel 3 is to be set in a range from 3.5 to 10 mm, depending on the viscosity of the adhesive 7.

Referring to FIGS. 5 and 6, the operation of the charging device 1 will now be explained. Although the present Example is directed to a case where the adhesive 7 is charged into a gap between the liquid crystal panel 2 and the protective panel 3 which are rectangular-shaped, the shape of the panels 2, 3 is not necessarily rectangular-shaped.

Figure 6A:
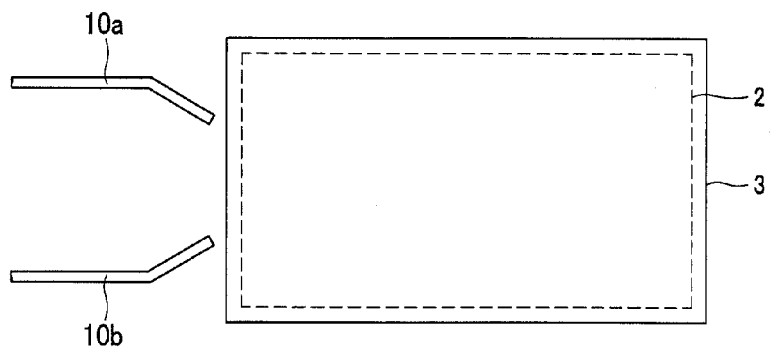
FIG. 6A is a plan view showing the state in which a protective panel has been sucked onto a protective panel holding stage.

Initially, in the charging apparatus 1, the liquid crystal panel holding stage 4 and the protective panel holding stage 5 are separated away from each other by the actuator 6. The liquid crystal panel 2 is sucked onto the liquid crystal panel holding stage 4, whilst the protective panel 3 is sucked onto the protective panel holding stage 5 (FIGS. 5A, 6A).

Both the liquid crystal panel holding stage 4 and the protective panel holding stage 5 are transparent, though not in a limiting fashion. These stages are respectively provided with marks for position registration by means of which it is possible to place the liquid crystal panel 2 and the protective panel 3 in register correctly with each other. With the charging apparatus 1, the liquid crystal panel 2 and the protective panel 3 may be placed in register with each other, either manually or automatically, using the marks for position registration, by way of performing preset position matching.

At this time, the first nozzle stage 19 has been moved by control means in the anti-arrow X direction in FIG. 1, and hence the emission nozzle 10 has been receded out of the gap between the liquid crystal panel 2 and the protective panel 3 in the anti-arrow X direction.

Figure 6B:
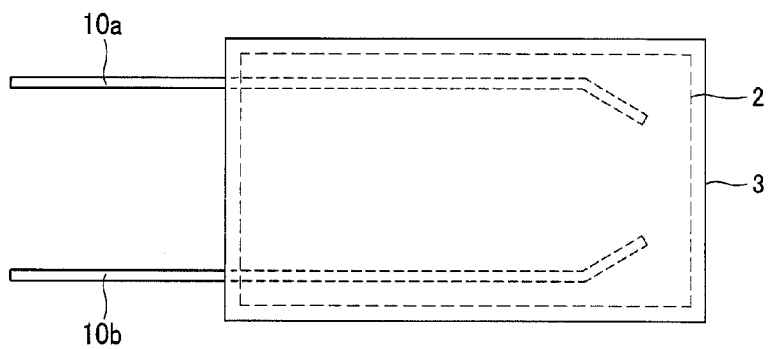
FIG. 6B is a plan view showing the state in which the emission nozzle has been introduced into the gap via one end sides of a liquid crystal panel and a protective panel.

After the end of the position matching of the liquid crystal panel 2 and the protective panel 3, in the charging apparatus 1, the two first nozzle stages 19 are slid in the arrow-X direction, under the operation of the control means. By so doing, the emission nozzles 10 are introduced into the gap via longitudinal end sides 2a, 3a of the liquid crystal panel 2 and the protective panel 3 (FIGS. 5B, 6B). At this time, the emission nozzles 10 are introduced into the gap at a height which has been adjusted in advance so that, when the emission nozzles 10 approach the liquid crystal panel 2 and the protective panel 3, the emission nozzles 10 will not be contacted with the panels (FIG. 5B). On the other hand, the emission nozzles 10 are so positioned that the emission openings 17 thereof will be in the vicinity of the opposite lateral side 2b of the liquid crystal panel 2 and the opposite lateral side 3b of the protective panel 3 (FIG. 6B).

Then, in the charging apparatus 1, the actuator 6 is actuated to cause the liquid crystal panel holding stage 4 and the protective panel holding stage 5 to approach to each other to maintain the liquid crystal panel 2 and the protective panel 3 at a preset distance from each other (FIG. 5C).

Figure 6C:
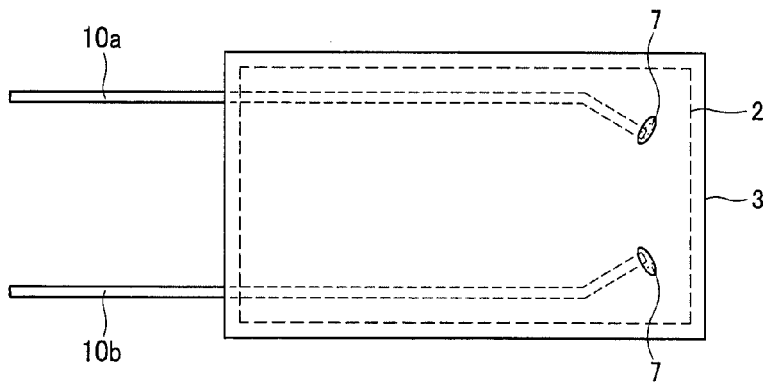
FIG. 6C is a plan view showing the state in which the emission nozzle is drawing a preset plot pattern in the gap between the liquid crystal panel and the protective panel.

Then, under the operation of the control means of the charging apparatus 1, the adhesive 7 is emitted via the emission nozzles 10, as the first nozzle stage 19 and the second nozzle stage 20 are moved, in order to plot a preset charging pattern in the gap between the liquid crystal panel 2 and the protective panel 3 (FIGS. 5D and 6C). At this time, the adhesive 7 is emitted as the emission nozzles 10 are moved in the anti-arrow X direction, the arrow-Y direction and in the anti-arrow Y direction. Hence, there is no risk of the emission opening 17 of the emission nozzle 10 intruding into the adhesive charged into the gap between the liquid crystal panel 2 and the protective panel 3 to prevent the adhesive 7 from becoming affixed to the nozzle main member. Hence, in the charging apparatus 1, there is no danger of the adhesive 7 attached to the emission nozzle 10 from becoming affixed to unforeseen sites.

Figure 6D:
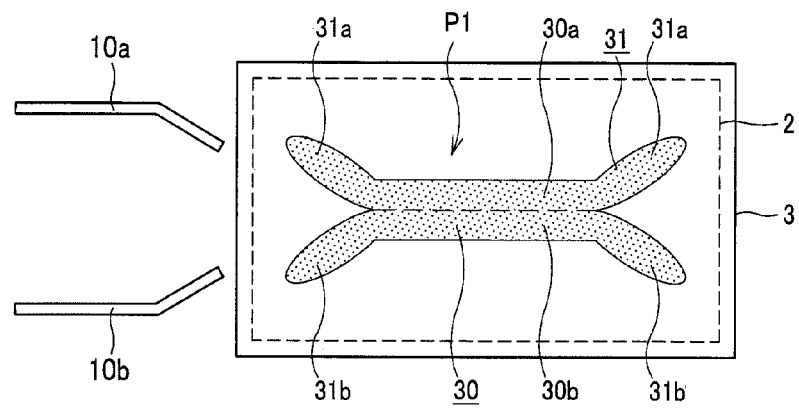
FIG. 6D is a plan view showing the state in which the emission nozzle emits an adhesive as it is moved to draw a preset plot pattern.

Moreover, the emission nozzle 10 is formed as its emission opening 17 is directed upwards, as described above, so that, when the adhesive 7 has commenced to be emitted, the adhesive 7 becomes affixed to the protective panel 3 disposed at an upper site. The adhesive 7 then descends so as to be affixed to the liquid crystal panel disposed at a lower site. The emission nozzle 10 continues to emit the adhesive 7 to draw a preset plot pattern P1, as the emission nozzle is moved in the anti-arrow X direction, an arrow-Y direction and in the anti-arrow Y direction (FIGS. 5E, 6D). Since the emission nozzle 10 applies the adhesive 7 as the adhesive 7 becomes affixed to both the liquid crystal panel 2 and the protective panel 3 at the same time, it is possible to prevent air bubbles from being left over in the adhesive 7.

Referring to FIG. 6D, the plot pattern P1 of the adhesive 7, charged into the gap between the liquid crystal panel 2 and the protective panel 3, is made up of a thick line part 30 and two thin line parts 31. The thick line part is plotted for extending along the longitudinal direction from the center of each of the liquid crystal panel 2 and the protective panel 3, whilst the thin line parts 31 are extended from both ends of the thick line part 30 towards four corners of the liquid crystal panel 2 and the protective panel 3. The thick line part 30 is formed at about the center along the longitudinal direction of each of the liquid crystal panel 2 and the protective panel 3, whilst the thin line parts 31 are continuously extended from both longitudinal ends of the thick line part 30 towards the four corners of the liquid crystal panel 2 and the protective panel 3.

The plot pattern P1 is formed by an emission nozzle 10a and another emission nozzle 10b of the charging apparatus 1 drawing symmetrical pattern portions in the transverse direction with respect to the thick line part 30. The emission nozzle 10a and the other emission nozzle 10b are provided on the charging apparatus 1. That is, the emission nozzle 10a draws a thick line part portion 30a and two thin line part portions 31a on one side of the plot pattern P1. The other emission nozzle 10b draws a thick line part portion 30b and two thin line part portions 31b on the other side of the plot pattern P1. The two emission nozzles 10a, 10b are moved by the nozzle movement unit 11 in synchronization with each other. More precisely, the two emission nozzles are receded in the anti-arrow X direction and moved towards each other in the arrow-Y direction and in the anti-arrow Y direction in order to plot the thin line parts 31b (one of the thin line parts 31). The two emission nozzles are then receded in the anti-arrow X direction to plot the thick line part 30. Then, as the two emission nozzles are still receded in the anti-arrow X direction and simultaneously moved away from each other in the arrow-Y direction or in the anti-arrow Y direction in order to plot the opposite side thin line part 31b (the other of the thin line parts 31).

The thick line part 30 and the thin line part 31 may be drawn in a different way if, as the amount of emission of the adhesive 7 via the emission nozzle 10 per unit time is kept constant, the speed of movement of each of the first and second nozzle stages 19, 20 is controlled.

When the preset plot pattern has been formed in the gap between the liquid crystal panel 2 and the protective panel 3, the charging apparatus 1 actuates the first and second nozzle stages 19, 20 by the control means 21 to cause the emission nozzle 10 to be receded from the gap between the liquid crystal panel 2 and the protective panel 3 (FIG. 5F).

Figure 6E:
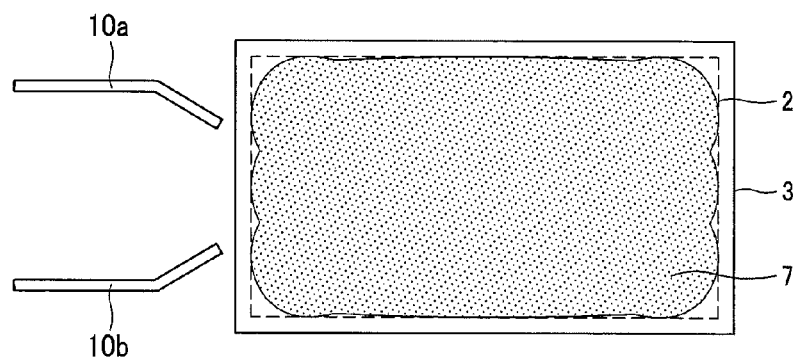
FIG. 6E is a plan view showing the state in which the liquid crystal panel and the protective panel are thrust to spread apart the adhesive.

The charging apparatus 1 then causes the liquid crystal panel holding stage 4 to descend by the actuator 6 to thrust the liquid crystal panel 2 and the protective panel 3 together to spread out the adhesive 7 (FIGS. 5G and 6E). In the charging apparatus 1, the plot pattern P1 is formed symmetrically at the center of the panels 2, 3, and hence is spread out evenly over the two panels 2, 3 in their entirety. Moreover, in the charging apparatus 1, since the thin line parts 31 are extended towards the four corners of the panels 2, 3, the adhesive 7 is spread out positively to the four corners of the panels 2, 3. It is noted that the thrust force or the time duration of the thrust by the actuator 6 are determined depending on the size of the gap between the liquid crystal panel 2 and the protective panel 3, viscosity of the adhesive 7 or its coating amount. For example, the thrust force and the time duration of the thrust are set at 2.5 kPa and at 0.3 sec, respectively.

Figure 6F:
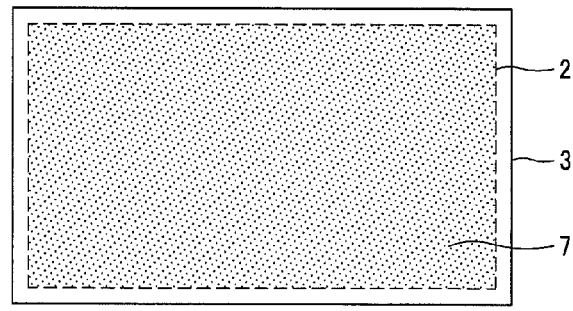
FIG. 6F is a plan view showing the state in which the adhesive has been charged to each niche between the liquid crystal panel and the protective panel.

Thereafter, the thrusting by the actuator 6 in the charging apparatus 1 is released. The suction of the liquid crystal panel 2 by the liquid crystal panel holding stage 4 as well as that of the protective panel 3 by the protective panel holding stage 5 is released. The resulting product is then kept at ambient pressure for a preset time interval, such as for five minutes. This evenly charges the adhesive over the entire extent of the gap between the liquid crystal panel 2 and the protective panel 3, including its four corners (FIG. 6F). After the adhesive 7 has been charged over the entire extent of the gap in this manner, the adhesive is cured by irradiation with ultraviolet rays by an ultraviolet ray illumination device, not shown.

Since the charging device draws the plot pattern P1, as a symmetrical pattern, by as it were a "single-stroke" drawing, the plot pattern P1, spread out evenly, may be drawn in the shortest possible time.

Figure 7:
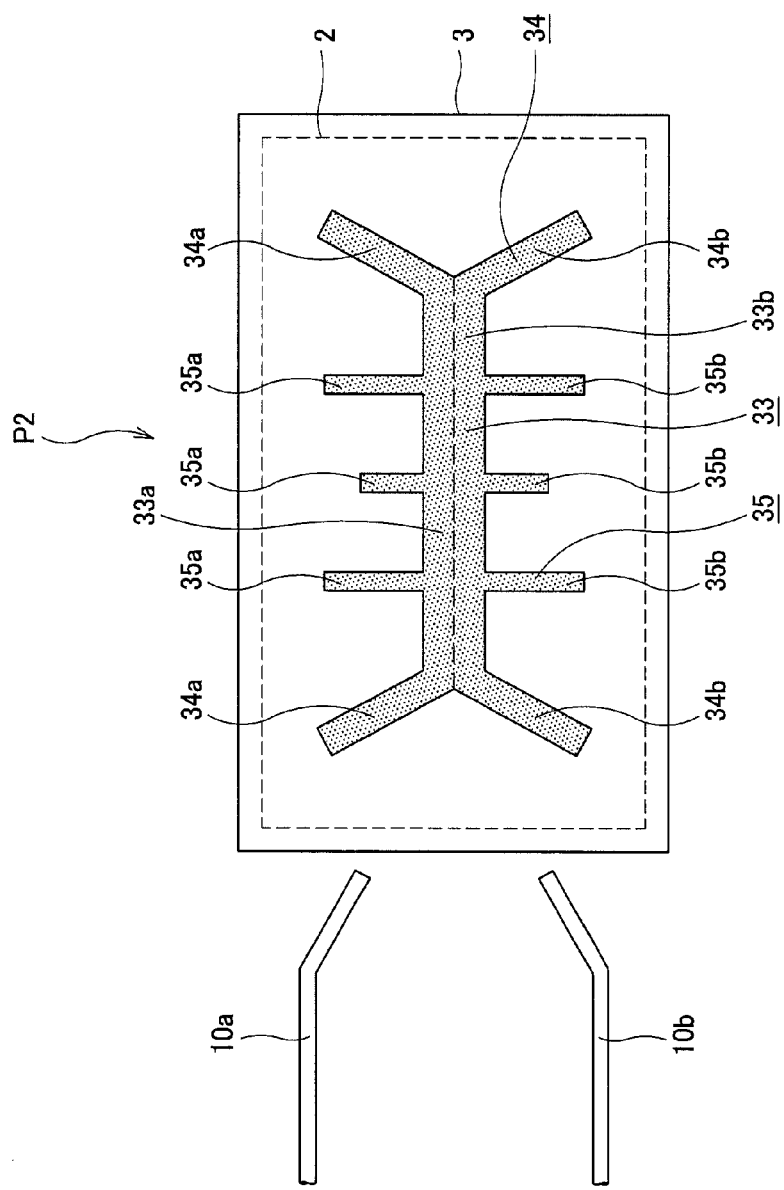
FIG. 7 is a plan view showing another plot pattern drawn by the charging apparatus.

The pattern plotted by the charging device 1 is not limited to the pattern shown in FIG. 6D. That is, such a pattern in which no air bubbles are mixed and in which the adhesive 7 may be charged in a preset time to every corner or niche, may be selected depending on the size of the liquid crystal panel 2 and the protective panel 3 or on the viscosity of the adhesive 7. For example, a plot pattern P2, shown in FIG. 7, is made up of a trunk line part 33, an inclined line part 34 and a branched line part 35. The trunk line part 33 extends along the longitudinal direction of the liquid crystal panel 2 and the protective panel 3, and the inclined line part 34 extends from both ends of the trunk line part 33 towards the four corners. The branched line part 35 extends from the trunk line part 33 along the transverse direction of the liquid crystal panel 2 and the protective panel 3.

The plot pattern P2, shown in FIG. 7, is formed by the emission nozzle 10a and the other emission nozzle 10b drawing symmetrical pattern portions in the transverse direction with respect to the trunk line part 33. The emission nozzle 10a and the other emission nozzle 10b are provided on the charging apparatus 1. The emission nozzle 10a draws a one-half trunk line portion 33a, a one-side inclined line portion 34a and a one-side branched line portion 35a on one side of the plot pattern P2. The other emission nozzle 10b draws the other half trunk line portion 33b, the other side inclined line portion 34b and the other side branched line portion 35b of the plot pattern P2. The two emission nozzles 10a, 10b are moved in synchronization with each other by the nozzle movement unit 11, such as to draw the plot pattern P2 at the same timing.

In the plot pattern P2, the one-half trunk line portion 33a and the other half trunk line portion 33b make up the trunk line part 33. A pair of one-side inclined line portions 34a and a pair of the other side inclined line portions 34b make up the inclined line part 34 that extends from both sides of the trunk line part 33 towards the four corners. A plurality of one-side branched line portions 35a, extending from the one-half trunk line portion 33a towards one sides along the transverse direction of the liquid crystal panel 2 and the protective panel 3, and a plurality of the other-side branched line portions 35b, extending from the other half trunk line portion 33b towards the other sides along the transverse direction of the liquid crystal panel 2 and the protective panel 3, make up the branched line part 35 extending from the trunk line part 33 along the transverse direction of the liquid crystal panel 2 and the protective panel 3.

In this plot pattern P2, the number of the branched lines of the branched line part 35 is determined depending on the size of the liquid crystal panel 2 and the protective panel 3, whilst the total coating volume of the adhesive 7 in the branched line part 35 is set so as to be not greater than the sum of the total coating volumes of the adhesive 7 in the trunk line part 33 and in the inclined line part 34. In the plot pattern P2, a plurality of the branched line portions is provided in the branched line part 35, as described above. Thus, in the process steps of the thrusting actuation by the actuator 6 and of providing the thrusting released state and the suction released state at ambient pressure for a preset time interval, the branched line part 35 is spread quickly to side edges of the liquid crystal panel 2 and the protective panel. Hence, the adhesive 7 may positively be charged to every niche in the gap between the liquid crystal panel 2 and the protective panel 3.

Moreover, in the charging apparatus 1, in which the two emission nozzles 10a, 10b are caused to be moved in synchronization with each other, the plot pattern P2 may be drawn at a time, and hence the time for coating the adhesive 7 may be reduced. The coating of the adhesive 7 may thus be completed in a shorter time. Moreover, since the charging apparatus 1 is able to draw the plot pattern P2 symmetrically, the adhesive 7 may be charged uniformly over the entire gap between the liquid crystal panel 2 and the protective panel 3.

It is not always necessary with the charging apparatus 1 to draw the plot pattern P symmetrically, depending on the panel shape. It is also possible with the charging apparatus 1 to draw the plot pattern P symmetrically by causing movement of the single emission nozzle 10. It is further possible with the charging apparatus 1 to draw the symmetrical shape of the plot pattern P so that there will be at least one contact point operating as a point of symmetry. In addition, if the adhesive 7 is applied to, for example, circular-shaped panels 2, 3, it is sufficient that a circular-shaped plot pattern P2 is formed centrally of the panels 2, 3.

It is possible for the nozzle movement unit 11 to have a plurality of emission nozzles 10 configured for being intruded into a gap between the liquid crystal panel 2 and the protective panel 3 from the opposing sides of the panels. The liquid crystal panel 2 and the protective panel 3 may become larger to a size equivalent to a liquid crystal television 12 inch or even larger. In such case, a plurality of emission nozzles 10 and nozzle movement units 11 are provided on both opposing sides of the panels, as shown in FIG. 8, and the adhesive 7 is coated simultaneously by both side nozzles to reduce the time needed in coating the adhesive 7.

Figure 8:
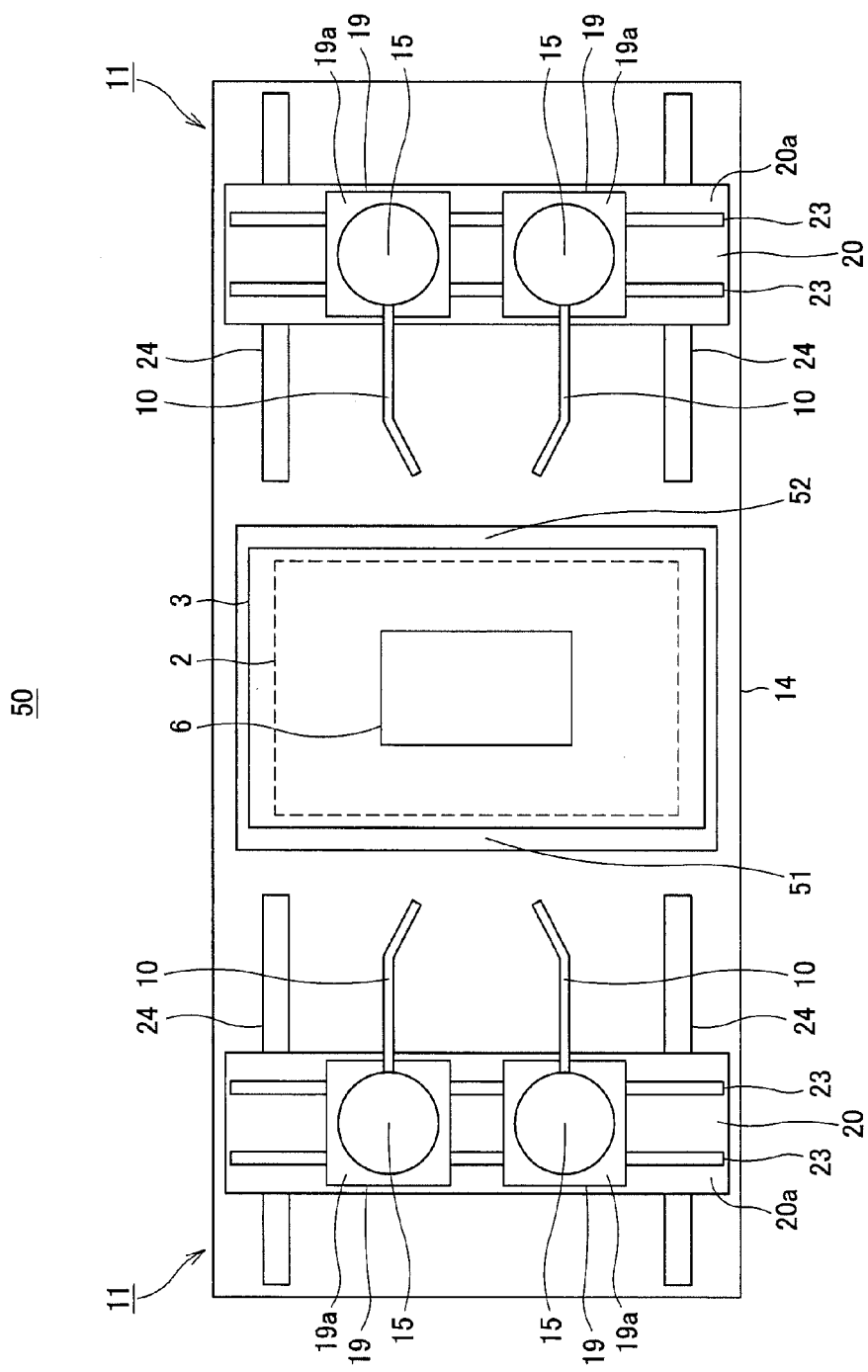
FIG. 8 is a plan view showing a modified charging apparatus according to one or more embodiments of the present invention.

That is, in the charging apparatus 50, shown in FIG. 8, there are provided two emission nozzles 10 and two nozzle movement units 11 configured for causing movements of the two emission nozzles 10 on both transverse sides of the liquid crystal panel 2 and the protective panel 3. In the process step of coating the adhesive 7, the charging apparatus 50 introduces the two emission nozzles 10 at a side 51 and an opposite side 52 along the transverse side edges of the two panels to draw a desired plot pattern P.

At this time, the two emission nozzles 10 are synchronously moved from mid portions of the two panels 2, 3 in a direction towards the sides 51, 52 as introducing sides and in a direction along the longitudinal sides of the two panels 2, 3. When the drawing operation has come to a close, each emission nozzle 10 is receded from the introducing side 51 or 52. It is thus possible for the nozzle movement units 11 to move the emission nozzles 10 over the shortest route and hence to complete the drawing of the preset plot pattern P in a short time even though the panels are of larger size.

In case of introducing the adhesive 7 into the gap between small-sized to medium-sized panels 2, 3, it is sufficient to provide a single emission nozzle 10 or a plurality of emission nozzles just on one longitudinal sides of the ectangular-shaped liquid crystal panel 2 and protective panel 3, as shown in FIG. 6(A) to (F). Even if the adhesive 7 is charged into the gap of small- or medium-sized panels 2, 3, one or a plurality of emission nozzles 10 may, of course, be provided on both longitudinal sides of the two rectangular-shaped panels 2, 3.

The foregoing description has been made of an apparatus for charging the adhesive 7 into the gap between the two plate-shaped members to bond the two panels together. It is however also possible that three or more plate-shaped members are held with their major surfaces facing each other and that the adhesive or the like charging liquid is charged into the gap between the plate-shaped members.

In this case, the intermediate plate shaped members other than those forming the uppermost and lowermost layers get their lateral sides suitably retained to hold both major surfaces of the intermediate plate shaped members open. In the present charging apparatus, the charging nozzle(s) for charging the liquid into each gap between the plate-shaped members and the nozzle movement unit may be provided for each gap between the neighboring plate-shaped members. In this case, the multiple emission nozzles for charging the liquid into the space between the plate-shaped members and the nozzle movement units 11 may be provided for each side of the rectangular plate-shaped member. On the other hand, the single emission nozzle may be used and actuated into movement for charging the liquid into a plurality of gaps.

INDUSTRIAL UTILIZABILITY

One or more embodiments of the present invention may be used for bonding a plasma display and its protective panel together in addition to bonding the liquid crystal panel 2 and the protective panel 3. One or more embodiments of the present invention may also be used for bonding a variety of monitors, such as television, a mobile phone, a PDA, mobile game set, a digital still camera, a video camera, a digital photo frame, an organic EL or a touch panel with a corresponding protective panel.

The invention claimed is:

1. A charging apparatus comprising:
a plurality of holding members that holds a pair of plate-shaped members in a state the major surfaces of the plate-shaped members face each other;
a movement member that causes the holding members to be moved towards and away from each other;
an emission nozzle configured to be introduced into a gap between the plate-shaped members, retained by the holding members, to emit the charging liquid into the gap;
a nozzle movement unit that causes movement of the emission nozzle in an in-plane direction of the plate-shaped members;
a reservoir in which the charging liquid is to be accumulated; and
a thrust unit that causes the charging liquid accumulated in the reservoir to be emitted via the emission nozzle; wherein,
the charging liquid, emitted via the emission nozzle, is charged as the liquid is contacted with the plate-shaped members carried in a relation of facing each other, and
the nozzle movement unit is configured to cause movement of the emission nozzle in at least two non-parallel directions while the emission nozzle emits the charging liquid so as to plot a preset emission pattern.

2. The charging apparatus according to claim 1, wherein,
the holding member holds the plate-shaped member with major surfaces thereof disposed horizontally;
the nozzle having an emission opening for the charging liquid facing upwards.

3. The charging apparatus according to claim 2, wherein,
the nozzle extends parallel to the plate-shaped member; an angle $\alpha$ of the emission opening being such that $30° \leq \alpha < 90°$.

4. The charging apparatus according to claim 1, wherein,
there are provided a plurality of the emission nozzles; each of the emission nozzles intruding into the gap via a side of each of the paired plate-shaped members.

5. The charging apparatus according to claim 1, wherein,
the emission nozzles are provided on one side and on an opposite side of each of the plate-shaped members; the emission nozzles intruding into the gap via the one sides and the opposite sides of the paired plate-shaped members.

6. The charging apparatus according to claim 4, wherein,
there are provided two of the emission nozzles; each emission nozzle drawing a symmetrical shape with the charging liquid; the symmetrical shape having a thick line part extending along the longitudinal direction of the plate-shaped members and a thin line part extending from the thick line part outwardly along the transverse direction of the plate-shaped members.

7. The charging apparatus according to claim 1, wherein,
the paired plate-shaped members, carried in a facing relation to each other, are a picture image display panel and a transparent protective panel bonded to the picture image display panel; the charging liquid being a transparent resin.

8. The charging apparatus according to claim 1, further comprising:
curing means for curing the charging liquid charged into the gap.

9. The charging apparatus according to claim 5, wherein,
there are provided two of the emission nozzles; each emission nozzle drawing a symmetrical shape with the charging liquid; the symmetrical shape having a thick line part extending along the longitudinal direction of the plate-shaped members and a thin line part extending from the thick line part outwardly along the transverse direction of the plate-shaped members.

* * * * *